(12) United States Patent
Nourian

(10) Patent No.: US 8,554,380 B2
(45) Date of Patent: Oct. 8, 2013

(54) WEATHER BASED IRRIGATION CONTROLLER

(75) Inventor: Daniel Nourian, Reedley, CA (US)

(73) Assignee: National Diversified Sales, Inc., Woodland Hills, CA (US)

( * ) Notice: Subject to any disclaimer, the term of this patent is extended or adjusted under 35 U.S.C. 154(b) by 326 days.

(21) Appl. No.: 13/022,425

(22) Filed: Feb. 7, 2011

(65) Prior Publication Data

US 2012/0203382 A1     Aug. 9, 2012

(51) Int. Cl.
*G05D 11/00* (2006.01)

(52) U.S. Cl.
USPC .................. 700/284; 700/9; 700/19

(58) Field of Classification Search
USPC ................................. 700/284, 9, 19
See application file for complete search history.

(56) References Cited

U.S. PATENT DOCUMENTS

| 5,870,302 A * | 2/1999 | Oliver ............................. 700/11 |
| 7,048,204 B1 * | 5/2006 | Addink et al. ................. 239/63 |
| 2011/0093123 A1 * | 4/2011 | Alexanian ..................... 700/284 |

* cited by examiner

*Primary Examiner* — Carlos Ortiz Rodriguez
(74) *Attorney, Agent, or Firm* — David J. Pitman; Fulwider Patton LLP

(57) ABSTRACT

A weather based irrigation controller has a thermometer that provides a temperature signal to the controller and a rain gauge that provides a rainfall signal to the controller, for adjusting irrigation schedules. A default mode is initiated when either sensor fails, and introduces an adjustment to the maximum irrigation duration based on historical stored data.

19 Claims, 7 Drawing Sheets

WEATHER BASED IRRIGATION CONTROLLER

BACKGROUND

The present invention relates to a system and method for regulating the operation of an irrigation system. More particularly, the invention pertains to a system and method for regulating the operation of an irrigation system which is responsive to user programmed information.

Automatic irrigation systems such as those employed for landscape and agricultural watering are well known in the art. Typical irrigation systems use a means of controlling watering cycles via an automatic controller. The need to control watering cycles due to seasonally changing environmental conditions is important for saving water, saving costs, optimizing growing conditions, and preventing unsafe conditions.

Typically, a user will enter instructions into a microprocessor based controller that will cause the irrigation system to start irrigation at a certain time, on certain days, for a certain duration, according to the user's instructions. Irrigation may be based on "zones" in which a group of sprinkler heads discharge in unison, or sequentially, or a combination of both.

Typically, a user who programs the microprocessor in the summer month of July to deliver an irrigation event of a certain duration on certain days from a particular irrigation system, would, if reminded to attend to the issue, reduce that duration over the fall, winter, and spring months to take account of changing seasonal environmental conditions that can be expected to prevail in the vicinity of the irrigation system, and the user might reduce the duration accordingly each month, or shorter period, before increasing it again. Frequently, however, many users tend to forget to downwardly adjust the irrigation duration after the hot summer months to account for the reduced evapo-transpiration rates over the following months. At best, a user may remember to adjust irrigation for some months or a shorter period, but not others. As a result, the irrigation system may continue to discharge water in irrigation during the fall and winter at a rate that was selected to be suitable during the summer, or some other time. This can be very wasteful, not to mention destructive in the case of certain crops, grasses, flowers, and shrubs that react adversely to over or under watering.

Consequently, solutions have been developed for taking into account actual prevailing environmental conditions, and for automatically adjusting irrigation duration to take account of changed conditions in real time. These solutions typically employ one or more sensors that monitor changes in environmental conditions in real time. (As used herein, the term "real time data" refers to information that is acquired for immediate use, and is distinguished from "historical data" which refers to data collected on one date in one year for use on a similar date in a later year. Average historic data is data from a plurality of previous years that has been averaged to provide one mean value.) A sensor may be located near an associated controller, and may be linked to the controller either by wireless communication or by physical connection. Such a sensor may measure actual precipitation, actual temperatures, actual wind speed, soil moisture, humidity, and other environmental factors, all in real time. Based on these measurements which are transmitted back to the controller, the controller uses preprogrammed logical algorithms to decide how to adjust a preprogrammed irrigation schedule to account for changed environmental conditions. For example, if high temperatures and dry conditions are recorded, irrigation duration may be increased. If wet or cold conditions are noted, irrigation may be reduced or suspended altogether.

However, such weather sensor based systems may have drawbacks and disadvantages. Typically, weather sensors are mounted where they are exposed to the elements and once mounted may malfunction, or may be difficult to maintain in operation. Thus, while a failed sensor is awaiting repair, the controller may be obliged to discharge an amount of irrigation water that is not adjusted for prevailing weather conditions, and that may therefore be wasteful and/or destructive.

Accordingly, there is a need in the art for a weather based irrigation controller that may be sold and used universally, that is easy to use, that is inexpensive to manufacture, that is easy to install, initialize, maintain, and operate, but that also takes account of the fact that weather sensors may fail after installation in that it does not surrender all ability to adjust for seasonal weather variation in the event of such failure. The present invention addresses these and other needs.

SUMMARY OF THE INVENTION

In a preferred embodiment, the invention is a controller for controlling an irrigation schedule in an irrigation system, the irrigation system including a plurality of sprinkler heads connected via a plurality of conduits to a water source. The controller comprises a rain gauge configured to transmit to the controller a signal representing a recent rainfall amount. It further includes a thermometer configured to transmit to the controller a signal representing a prevailing temperature value. And it further includes an input means for permitting a user to enter irrigation parameters into the controller, wherein the parameters include a Maximum Irrigation Duration, an identifier for identifying the sector in which the irrigation system is located, and, the current date. It includes a database that includes stored information relating to historical meteorological conditions associated with each of a plurality of sectors located within a geographical area, the information may include, for each sector, (a) the historical period-average evapotranspiration rate for a plurality of periods over the duration of a year (b) the historical average solar radiation level for each month over the duration of a year (c) the solar radiation for the month of average summer high temperature and (d) the average summer high temperature. In a preferred aspect, the microprocessor may be configured to calculate and apply an amount of time to suspend the next irrigation event due to rainfall, the amount of time being based on measured inches of rainfall divided by the historical period-average evapotranspiration rate for the current period. In yet a further aspect, the microprocessor may be configured to calculate and apply a Next Irrigation Duration being equal to the Maximum Irrigation Duration multiplied by a ratio based on the product of the historical average solar radiation level for the current month and the previous day's measured high temperature, divided by the product of the solar radiation for the month of average summer high temperature and the average summer high temperature. And in yet a further aspect, the microprocessor may be configured to respond to a failure in receipt of the signal from at least one of the sensors by calculating and applying an Actual Irrigation Duration rather than a Next Irrigation Duration, the Actual Irrigation Duration being equal to the Maximum Irrigation Duration multiplied by a ratio based on the historical period-average evapotranspiration rate for the current period divided by the maximum period-average evapotranspiration rate that occurs in the course of a year. Preferably, the sector identifier is a zip code. Further preferably, the at least one of the sensors is the thermometer, but it may also be the rain gauge.

In another facet, the invention is a method of controlling an irrigation schedule by an irrigation system that includes a plurality of sprinkler heads connected via a plurality of conduits to a water source. The method comprises compiling a database that includes information relating to historical evapo-transpiration rates for a plurality of sectors located within a geographical area. Further, the method includes deriving, from the information, Period Reduction Factors applicable over a year for each sector, wherein the Period Reduction Factors are based on the historical period-average evapotranspiration rate for each period of the year for a sector, divided by the maximum period-average evapotranspiration rate that occurs in a year for that sector. As a result of these steps, the database may have an array of information in which each sector in a geographical area has, associated with it, a plurality of Period Reduction Factors, one Period Reduction Factor for each period of the year. The method further includes entering irrigation parameters into the controller, wherein the parameters include a Maximum Irrigation Duration, an identifier for identifying the sector in which the irrigation system is situated, and the current date. Further steps may include transmitting from a thermometer to the controller a signal reflecting a prevailing temperature value, and checking whether the signal is received by the controller. If the signal is received by the controller, then, the step of multiplying the Maximum Irrigation Duration by a temperature ratio, thereby computing a Next Irrigation Duration, wherein the temperature ratio is based on the product of the historical average solar radiation level for the current month and the previous day's high temperature, divided by the product of the solar radiation for the month of average summer high temperature and the average summer high temperature, and causing the irrigation system to irrigate for the Next Irrigation Duration at the next irrigation operation. However, if the signal is not received by the controller, then the step of adjusting the Maximum Irrigation Duration by multiplying the Maximum Irrigation Duration by a Period Reduction Factor for the current period associated with the sector that has been identified by the user, thereby obtaining an Actual Irrigation Duration for the current period for the identified sector; and causing the irrigation system to irrigate for the Actual Irrigation Duration during the current period. In a further aspect, the invention may include transmitting from a rain gauge to the controller a signal reflecting an amount of rain that has fallen, followed by calculating, at historically prevailing rates of evapotranspiration, an amount of time required for the amount of rainfall to evaporate, and suspending irrigation operations for at least the amount of time.

In yet a further facet of the invention, the invention is a method of controlling an irrigation schedule by an irrigation system that includes a plurality of sprinkler heads connected via a plurality of conduits to a water source. In this facet, the method comprises compiling a database that includes information relating to historical evapo-transpiration rates for a plurality of sectors located within a geographical area; deriving, from the information, Period Reduction Factors applicable over a year for each sector, wherein the Period Reduction Factors are based on the historical period-average evapotranspiration rate for each period of the year for a sector, divided by the maximum period-average evapotranspiration rate that occurs in a year for that sector, whereby the database has an array of information in which each sector in a geographical area has, associated with it, a plurality of Period Reduction Factors, one Period Reduction Factor for each period of the year. The method includes entering irrigation parameters into the controller, wherein the parameters include a Maximum Irrigation Duration, an identifier for identifying the sector in which the irrigation system is situated, and the current date. In a preferred aspect, the method includes transmitting from a rain gauge to the controller a signal reflecting an amount of rain that has fallen, checking whether the signal is received by the controller and, if the signal is received by the controller, then calculating and applying an amount of time to suspend the next irrigation event due to rainfall, the amount of time being based on measured inches of rainfall divided by the historical period-average evapotranspiration rate for the current period. The irrigation system is caused to be suspend the next irrigation event for the amount of time. On the other hand, if the signal is not received by the controller, then, the step of adjusting the Maximum Irrigation Duration by multiplying the Maximum Irrigation Duration by a Period Reduction Factor for the current period associated with the sector that has been identified by the user, thereby obtaining an Actual Irrigation Duration for the current period for the identified sector; and causing the irrigation system to irrigate for the Actual Irrigation Duration during the current period.

These and other advantages of the invention will become more apparent from the following detailed description thereof and the accompanying exemplary drawings.

DETAILED DESCRIPTION OF THE PREFERRED EMBODIMENTS

With reference to the drawings, which are provided for exemplification and not limitation, a preferred embodiment of an irrigation controller is described having features of the present invention.

Figure 1:
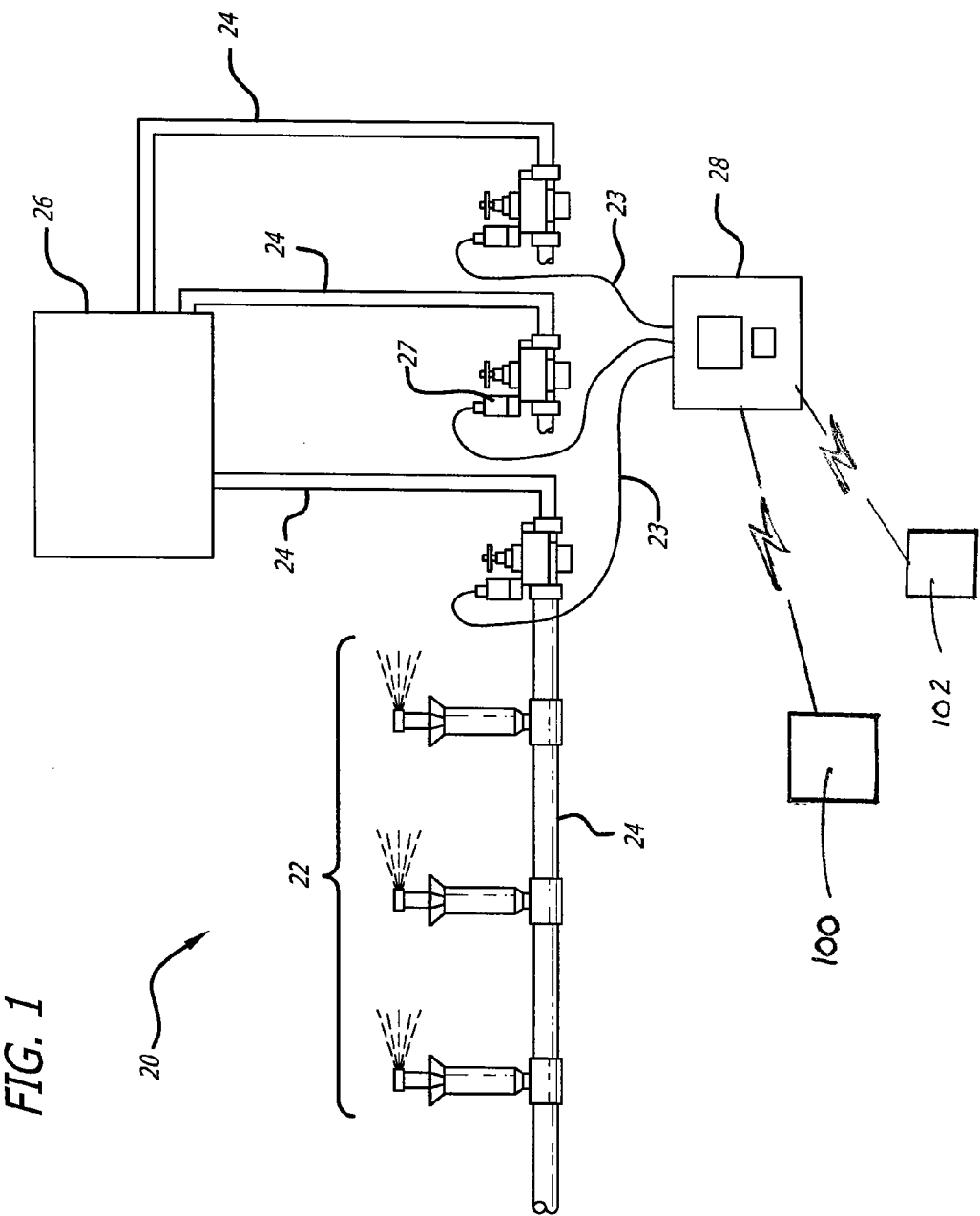
FIG. 1 is a schematic view of an irrigation system having features of the present invention.

With respect to FIG. 1, a typical irrigation system 20 includes a plurality of sprinkler heads 22, all linked by conduits 24 to a source 26 of water pressure, the heads being configured to discharge water onto a surrounding landscape either in unison, or one after the other, or in a combination of both. This system may include a number of "zones," in which sprinkler heads are dedicated to act in unison in different parts of a landscape. The overall system may be controlled by a single electronic controller 28, which activates water to flow in different portions of the system 20 at different times, and for selected durations.

Figure 2:
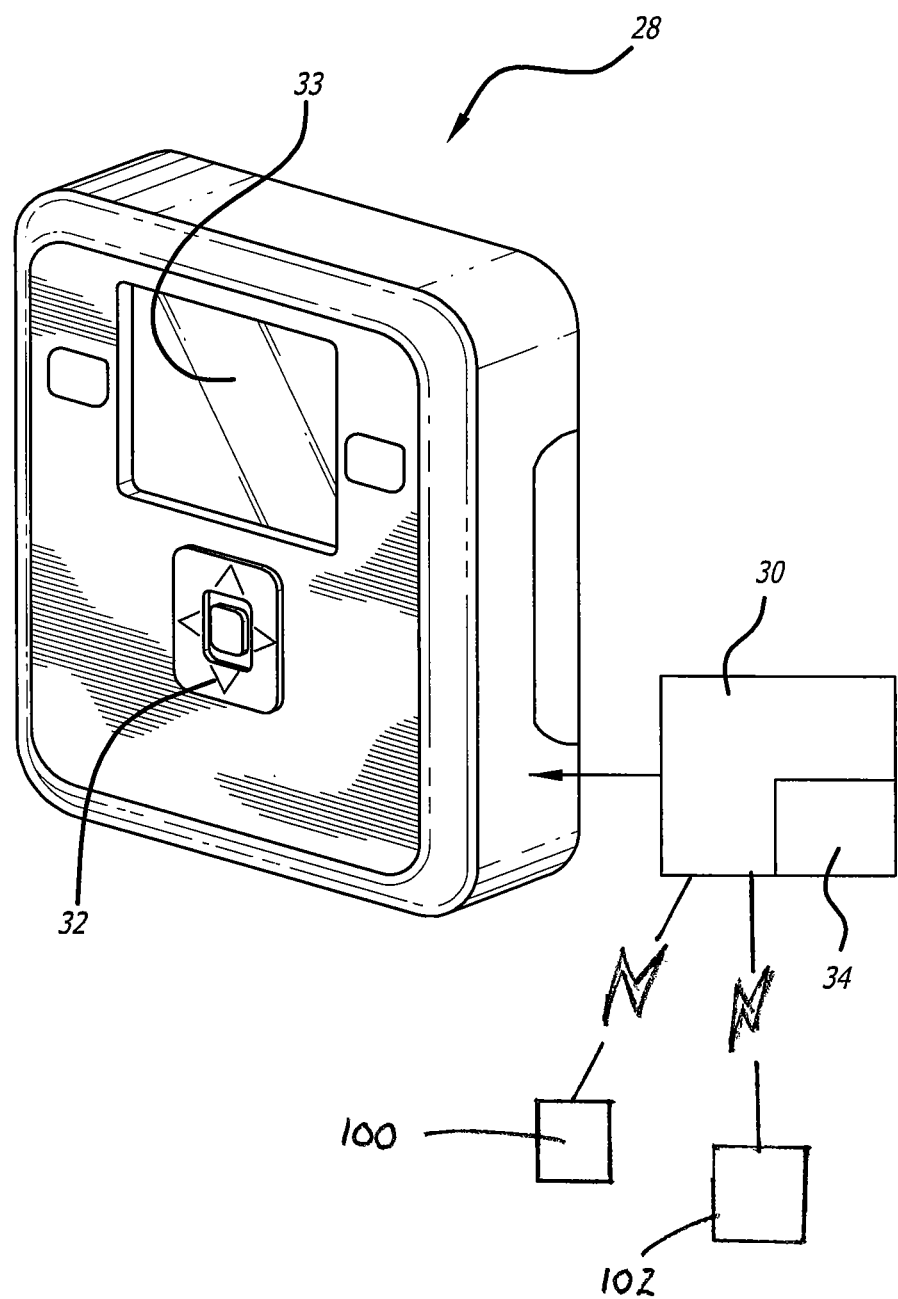
FIG. 2 is a schematic view of an irrigation controller as exemplified in FIG. 1.

In this context, a preferred embodiment of the present invention is described with respect to the figures. A preferred embodiment provides an irrigation system 20 that automatically adjusts the amount of water to be discharged by the system onto a surrounding landscape, according to anticipated environmental conditions in the vicinity of the system. A sprinkler controller 28 is provided that harnesses a microprocessor 30. (FIG. 2, showing the microprocessor schematically within the controller.) The controller also includes input means 32 such as a toggle switch for entering parameters such as the present time and date, the times of day to commence irrigation in each zone, the duration for an irrigation event, and the like into the microprocessor. It also includes an LCD screen 33 to facilitate entry of parameters. The controller 28 is operatively connected with conduits 24 that lead water from a supply 26 to a plurality of sprinkler heads 22 forming part of the irrigation system 20. The microprocessor 30 is configured to interpret instruction data that has been input by a user, and consequently to initiate irrigation via the conduits 24 according to such data, most particularly to commence irrigation and then to terminate irrigation after an appropriate irrigation duration has been completed. Such irrigation initiation is achieved through switched valves 27 that are electrically operated and are interposed between the controller 28 and the water supply 26, and operatively connected to the controller 28 via electrical wires 23.

Additionally, as seen in FIGS. 1 and 2, the controller may be in operative communication with a thermometer 100 and also in operative communication with a rain gauge 102. Communication may be by wireless communication, or it may be by wired connection. The thermometer may be of known design and construction, capable of transmitting a signal representing the prevailing temperature level. The rain gauge may be of known design and construction, preferably of tipping bucket design such as described in U.S. Pat. No. 3,943,762, which is incorporated herein by reference, and capable of transmitting a signal representative of an amount of rain that has fallen.

In a first aspect, the irrigation system of the present invention is configured to operate in a number of different "modes" that may be applied simultaneously, or sequentially, as described herein. In summary, there are at least two modes of operation, including a "weather station mode," and a "historical mode."

The weather station mode includes reliance upon two real time weather sensors, namely, the thermometer and the rain gauge referenced above. These sensors provide information that permits the irrigation controller to adjust a user pre-programmed irrigation schedule according to actual prevailing weather conditions. Thus, the weather station mode is divided into sub-modes that include a "weather station mode (temperature)" and a "weather station mode (rain)." As will be more fully explained below, the weather station mode (temperature) uses the thermometer to measure the daily temperature. The temperature level is transmitted to the processor by electronic signal. An algorithm in the processor then causes the controller to adjust the irrigation duration to prevent under-watering or over-watering depending on the previous day's maximum temperature. The weather station mode (rain), on the other hand, uses the rain gauge to measure any rainfall. The amount of rainfall is transmitted to the processor by electronic signal. An algorithm in the processor then causes the controller to suspend all irrigation for a period calculated to prevent duplication by irrigation of the watering that has taken place through rainfall.

However, the invention is also configured to take into account the fact that sensors are delicate components that may periodically fail, and that a significant amount of time may elapse before a failed sensor is detected and/or repaired. To take account of such possible failure, the invention includes a "historical mode" that provides an irrigation adjustment mode to substitute for a failed receipt of sensor signal. If the thermometer fails, alternatively, in another embodiment, if either the thermometer or the rain gauge fails, the historical mode will be activated and will provide a basis for irrigation adjustment based on historic data stored in the controller during manufacture, and prior to the sale of the controller to the end user. Thus, the invention includes two possible embodiments. In a first embodiment (exemplified with reference to FIG. 6), two separate electrical signals carry the signal for each sensor. In this first embodiment, failure of the thermometer signal alone will trigger the historical mode and terminate the weather station mode (temperature), while the weather station mode (rain) will continue simultaneously with the historical mode for as long as the rain sensor signal continues. Under this first embodiment, if the rain gauge signal alone fails, the historical mode will not be triggered because the integrity of each one of the two signals is measured independently of the other. In a second embodiment (exemplified with reference to FIG. 7), a single electrical impulse may carry the signal of both the thermometer and the rain gauge together to the controller. In this second embodiment, failure of either the rain or the temperature signal will trigger the historical mode because the electrical pulse as a whole will register with the microprocessor as corrupted.

Figure 6:
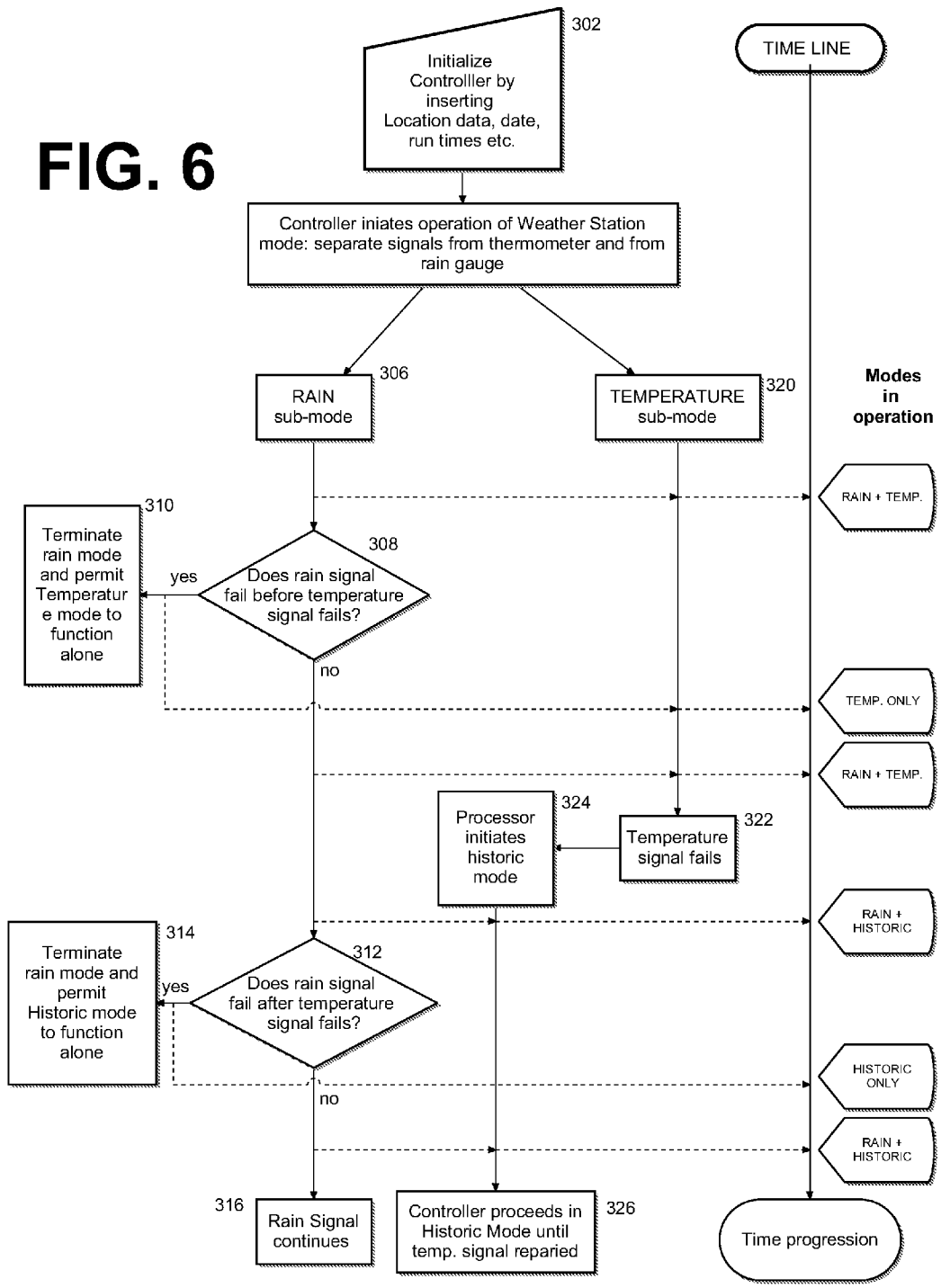
FIG. 6 is a flow diagram showing steps taken in a preferred embodiment of the invention.
Figure 7:
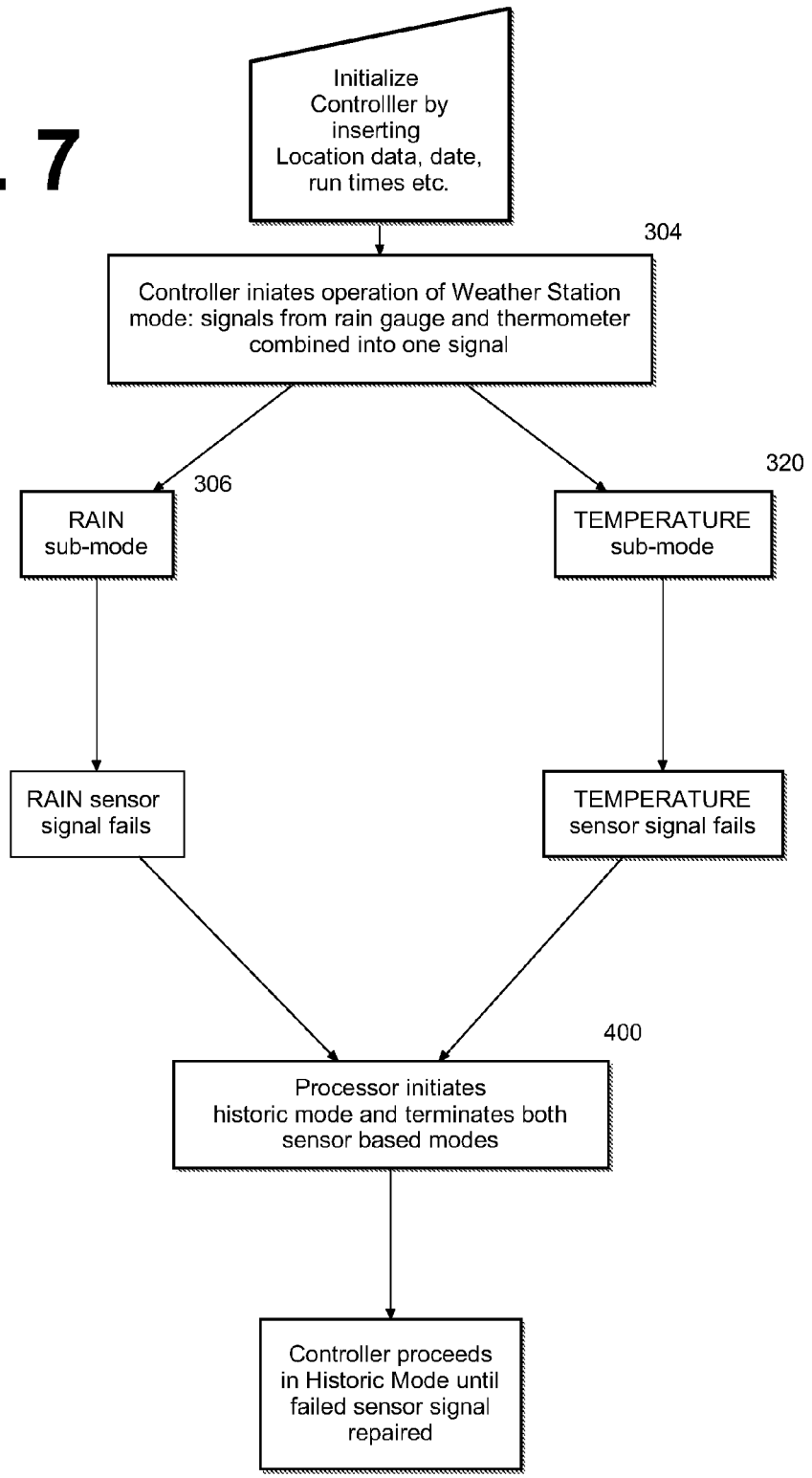
FIG. 7 is a flow diagram showing steps taken in another preferred embodiment of the invention.

The sequence and conditions under which the different modes of the irrigation controller may be initiated may be understood more fully with reference to FIGS. 6 and 7. This sequencing aspect of the invention will first be described. Thereafter, the features of the different modes themselves will be fully described. As seen with reference to the figures, the irrigation controller is first initialized 302 by the user who manually enters information to populate the required data fields of the processor. Such data may include irrigation operation start times, irrigation durations, the geographical zip code of the location of the controller, the current date, data relating to the rain gauge (preferably based on a tipping bucket configuration) and data relating to the thermometer. Once the controller is initialized, it will automatically initiate 304 the weather station mode. The weather station mode initiates the rain 306 sub-mode and the temperature 320 sub-mode to operate simultaneously.

Under the first embodiment (exemplified in FIG. 6), a subroutine of the processor checks 308 the status of the signal from the rain gauge and the signal from the thermometer. If the rain signal fails while the temperature signal is still operational, then the controller terminates 310 any irrigation adjustment based on rainfall, while allowing adjustment based on the temperature to continue. Thus, in these circumstances, only temperature based adjustment is applied.

Continuing to describe operation of the controller under the first embodiment, if the temperature signal fails 322 at any time, then the controller initiates 324 the historic mode. As explained more fully herein below, the historic mode relies upon a database that correlates the time of year, specifically, the date, with an average evapotranspiration rate applicable in the relevant geographical sector on that date to make irrigation adjustments. Once initiated, the historic mode continues to operate 326 until such time as the thermometer signal is repaired.

Thus, if the processor check 312 reveals that the rain signal fails after the thermometer signal has failed and the historic mode has therefore been initiated, the controller will terminate 314 the rainfall mode and will allow the controller to operate only in historic mode. However, if the temperature mode fails while the rainfall mode continues to operate, the controller may operate under both historic mode and rainfall mode.

These sequences allow the controller to advantageously initially apply irrigation adjustments based on prevailing rain and temperature conditions while both weather sensors are operating. However, if the temperature sensor fails, the controller is configured to make an adjustment based on an estimate of temperature effects, where the estimate is derived from stored historical evapotranspiration values. If only the temperature sensor has failed, the rainfall based irrigation adjustments continue. However, if the rainfall sensor fails, the controller may ignore the duplicative effect of rain and makes no irrigation adjustment therefor, but continues to make adjustments based on temperature values, or on historical evapotranspiration values should they be applicable. This aspect of the invention provides an advantageous improvement over the prior art because it ameliorates the problem that may arise in the event the delicate electronic equipment employed in the present invention should gradually fail, as may occur in a robust outside environment like that in which the present art is intended to operate. Instead of the irrigation adjustment component of the controller becoming entirely disabled during the period that the failures are not repaired, a backup system provides reasonable estimates of the effects of temperature, based on historical records, of what adjustments would be called for in the absence of any failure.

By contrast, under the principles of operation of the second embodiment (exemplified in FIG. 7) in which the signals of the rain gauge and the thermometer are combined into a single electronic pulse, failure of either signal may corrupt the entire pulse. Thus, upon the failure in the signal of either the rain gauge sensor or the temperature sensor, that is, upon detection of corruption in the single pulse, the processor is configured to terminate both the rain sub-mode and the temperature sub-mode, and initiate the historic mode 400.

When the user purchases and installs an irrigation control system 20 having features of the present invention, the controller 28 calls for certain information via the LCD screen 33, by prompting the user to enter the information sequentially via the input means 32. (FIG. 2.) In addition to the usual start times for each irrigation event in each of a plurality of zones, one important parameter that the user will be requested to enter in conjunction with each start time is the Maximum Irrigation Duration ("Dmax") for each irrigation event that the user wishes to occur during the period that the evapotranspiration rate ("ET rate") will be greatest in the location where the control system is being installed. A fuller description of ET rate is provided below. For example, although the user may be installing and setting up the unit in March, the controller will ask the user to enter the maximum irrigation duration (Dmax) that he wishes to apply at the peak of summer when the ET rate is greatest. Another parameter that the user will be requested to enter is the current date, and another is the identity of the sector in which the system 20 is being set up to operate. For a system intended to operate in the United States, this latter parameter will preferably be the postal zip code in which the system is installed, although cities or counties may also be used. The significance of these parameters will be explained below.

Weather Station Mode (Temperature)

As previously noted, in one aspect of the invention, the processor may apply a Weather Station Mode (Temperature). This mode is preferred for adjustments made due to prevailing temperature because it narrowly follows the temperature prevailing at the site of the controller. To operate under this mode, the controller receives data from the thermometer that measures the actual daily temperature in the vicinity of the controller, and notes the daily maximum temperature. This information is used in an algorithm for irrigation duration adjustment, as described below.

To enable this mode, the database in the microprocessor is configured to include a collection of stored data for geographic sectors that, preferably, may be conveniently identified by postal zip code (or other sector identifier such as city or county). This data is entered into the database by the manufacturer before the controller is sold. When the user enters into the controller the geographic zip code of the sector in which the controller is intended to be used, the microprocessor effectively knows where the controller is geographically located, based on the zip code. In each data set related to each sector, preferably by zip code, there is stored the following information: (i) The historic average summer high temperature; (ii) The historic average solar radiation level for the month in which the average summer high temperature occurred; and (iii) The historic average solar radiation level for each of the twelve months of the year, so that the historic average solar radiation level for the current month may be extracted based on the current date.

Using the above information, and using the previous day's high temperature (as measured by the thermometer), the microprocessor in the controller is configured to daily calculate a "temperature ratio" which is used to adjust irrigation durations for each sector, each day, as follows: (a) Identifying the historical average solar radiation level for the current month (A) from the database; (b) Identifying the previous day's high temperature, as measured by the thermometer (B); (c) Identifying the solar radiation for the month of average summer high (C) from the database; (d) Identifying the average summer high temp (D) from the database: (e) Determining the product of A and B divided by the product of C and D, or $(A \times B)/(C \times D)$, as being the "temperature ratio."

This "temperature ratio" is applied as a reduction factor against the user designated irrigation runtime for the summer high month, or the Maximum Irrigation Duration (Dmax) as previously described herein. The resulting duration arising from the product of the temperature ratio and the Maximum Irrigation Duration is referred to herein as the Next Irrigation Duration. It may be noted that the Next Irrigation Duration is preferably calculated daily before the day's irrigation occurs, based on the previous day's high temperature. As a result, the Next Irrigation Duration on one day is likely to differ from that of the previous day.

Historical Mode: Substitute For Weatherstation Mode (Temperature)

Figure 3:
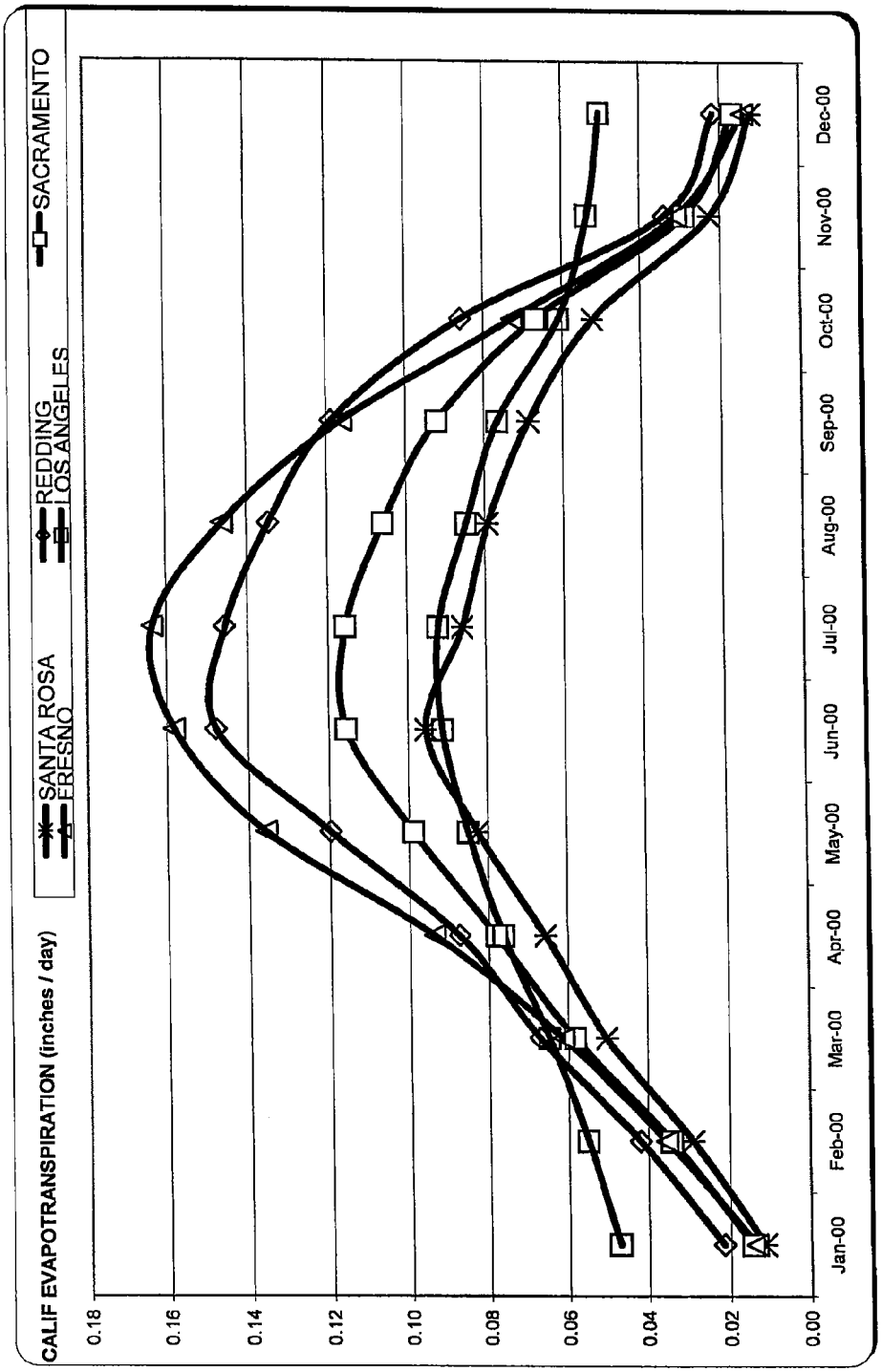
FIG. 3 is a graph of average evapo-transpiration rates in five different geographical sectors in California, over the period of one year.

The historical mode is a mode that the controller is configured to apply in the event that the thermometer signal fails (under the first embodiment, FIG. 6), or alternatively, where either the thermometer or rain gauge signal fails (under the second embodiment, FIG. 7). In an important aspect of this historical mode, the microprocessor 30 includes a database 34 configured to enable the controller 28, independently of the user and independently of any real time temperature measurements, to adjust the duration of irrigation for an irrigation event that has been instructed by the user. This adjustment is directed at reducing the amount of water discharged during irrigation for periods of the year when the evapo-transpiration ("ET") rate in the vicinity of the system 20 is lower than at its peak level. The peak level typically occurs some time in June through August of any year in the northern hemisphere. Evapo-transpiration is a term used to describe the sum of evaporation and plant transpiration from the earth's land surface to atmosphere. Evaporation accounts for the movement of water to the air from sources such as the soil, canopy interception, and waterbodies. Transpiration accounts for the movement of water within a plant and the subsequent loss of water as vapor through stomata in its leaves. Evapo-transpiration is an important part of the water cycle. Historical records of the ET rate for the United States have been kept and are available from a number of sources, including government managed weather stations such as CIMIS (California Irrigation Management Information System, maintained by the California Department of Water Resources), CoAgMet maintained by Colorado State University-Atmospheric Sciences, AZMET maintained by University of Arizona-Soils, Water and Environmental Science Department, New Mexico State University-Agronomy and Horticulture, and Texas A&M University-Agricultural Engineering Department. Although slight variations in the methods used to determine the ET values do exist, most ET calculations are based on the following environmental factors: temperature, solar radiation, wind speed and humidity. A typical plot of average evapo-transpiration rates against time for different cities in California in the United States over the period of a year is shown in FIG. 3.

In a preferred aspect of the invention, the database 34 includes historical records of the ET rate over a year throughout a geographical area, preferably throughout the United States, and also preferably throughout any part of the world in which historical ET rate records are known and where the irrigation system 20 may be used. The geographic area for which the database 34 is compiled is preferably broken down into a plurality of smaller sectors, each sector being identified for example by the name of a nearby town, or by county name, or even by state, where the ET rates are relatively uniform, but most preferably may be identified by a postal zip code as a small area within which the ET rates are likely to be uniform. Thus, in a preferred embodiment, the database 34 is compiled to reflect the historical average ET rate in each postal zip code area in the United States for a monthly, weekly, or shorter time period, over the duration of a year. While a month is a useful period of time in which to capture the changes in ET rate in a sector, a half-monthly period provides a smoother transition over the course of a year, and a weekly or daily period provides an even smoother transition. Daily average ET rates are also available in the historical record, and these rates may be used where it is desirable to follow a precise transition over the course of a year in short increments. For example, in FIG. 3, the ET rates for different parts of California are shown on curves that are smoothed and from which daily ET rates can be extracted. Similar records are available throughout the United States and other countries.

It will be understood that in a country such as the United States, many zip codes that are relatively closely situated will share the same ET data over the course of a year, but this fact need does not alter the ease with which each zip code may be assigned the appropriate ET data from historical sources. To this end, although the controller 28 may call for the entire zip code to be entered by a user, the database may be based on only the first three digits of a zip code, thus giving a less detailed breakdown of ET rates, although no less effective.

Figure 5:
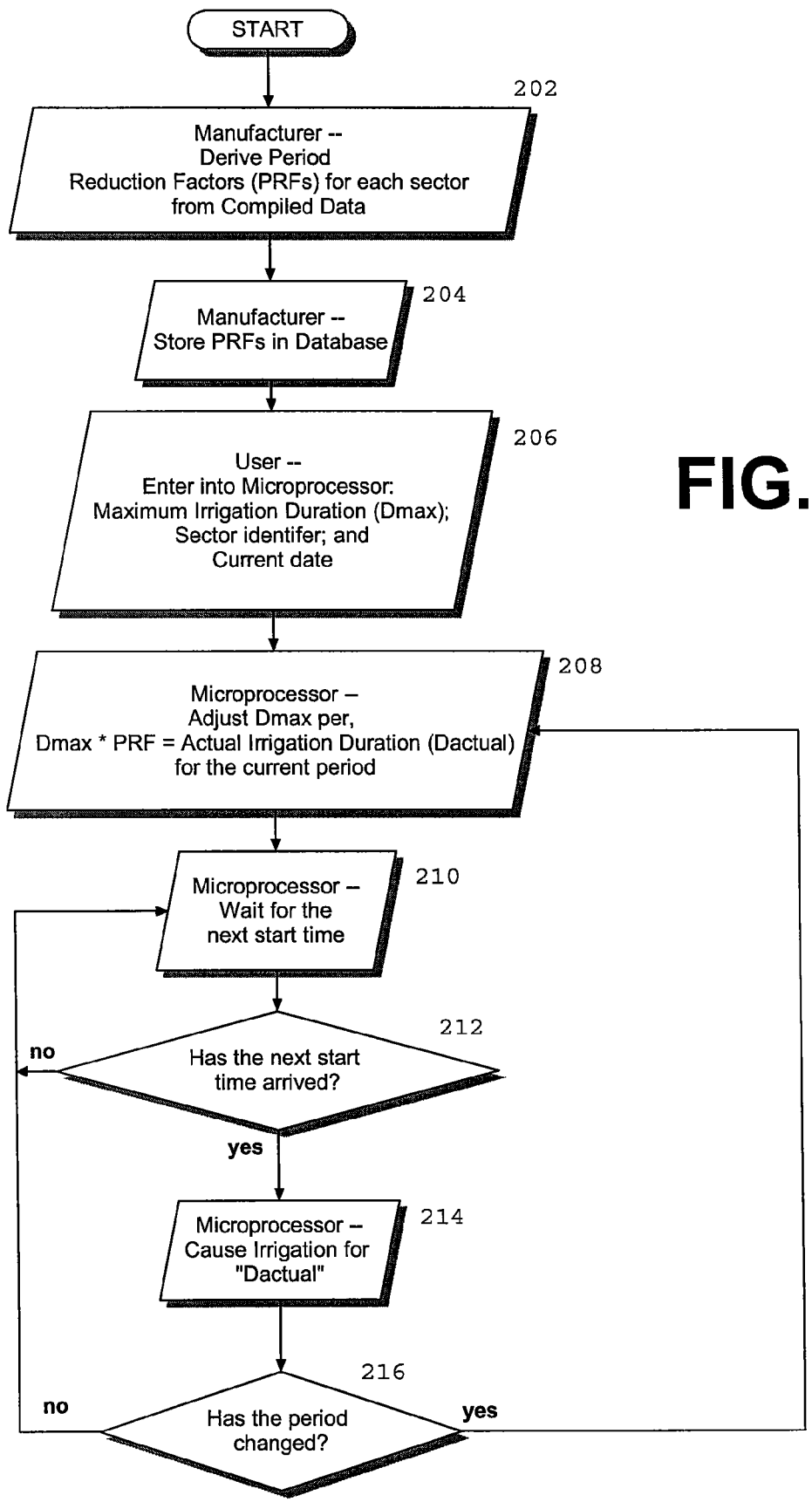
FIG. 5 is a flow diagram showing steps taken in a preferred embodiment of the invention.

Once the above described data is assembled for a geographical area, it is processed by performing 202 (FIG. 5) the following steps for each sector (e.g., zip code): (a) Identifying the maximum period-average ET rate that occurs in a year, "ETmax" (typically occurring some time June through August in the northern hemisphere); (b) Identifying the historical period-average ET rate for each period of the year, "ETperiod."; (c) Dividing ETperiod by ETmax, to provide a Period Reduction Factor for each period of the year, the "PRF" for each period.

As used above, the term "period" may refer to the period of a month, although a half-monthly, weekly, or even daily period may apply where appropriate.

Thus, preferably before a user even purchases a controller of the present invention, and therefore before any instructions have been entered into the microprocessor 30 by the user, the manufacture has compiled and stored 204 (FIG. 5) in the database 34 an array of historical information in which each sector (preferably, zip code) in a geographical area has, associated with it, a plurality of PRFs—one for each period of the year whether the period be a month, a half-month, a week, or a day. (See, FIG. 4.) It will be appreciated that alternative methodologies may be used to assemble the database 34. For example, the ET rates themselves may be entered into the database, in which an algorithm may be selected to extract the relevant PRF for application, but eventually an applicable PRF is derived from data within the microprocessor and all such methodologies are contemplated as falling within the scope of the invention.

Once the duration Dmax, the current date, and sector identification are entered 206 (FIG. 5), the microprocessor 30 performs the following adjustments to take into account the inevitable seasonal changes, and the changing ET rates, over the duration of a year. Based on the current date, the microprocessor selects the appropriate PRF for the applicable sector from the database 34. The microprocessor then computes 208 (FIG. 5) an Actual Irrigation Duration ("Dactual") for the current period by multiplying the maximum duration, Dmax, entered by the user, by the PRF for that period obtained from the database 34. Thus, in the period of January, for example, when the ET rate for a particular sector may be only 16% of the maximum summer ET rate in that sector (so that the PRF for January is 16%), the Actual Irrigation Duration, Dactual, will be computed to be 16% of Dmax. (See FIG. 4). The microprocessor 30 then sets the applicable duration for current irrigation events to be the Actual Irrigation Duration, Dactual, and not the maximum irrigation duration, Dmax. For other or shorter periods, the same principle will apply. Then, when the time arrives for irrigation on any day, the microprocessor 30 causes 214 (FIG. 5) the irrigation system to irrigate for a period of time Dactual rather than Dmax. This process is exemplified in FIG. 5.

Figure 4:
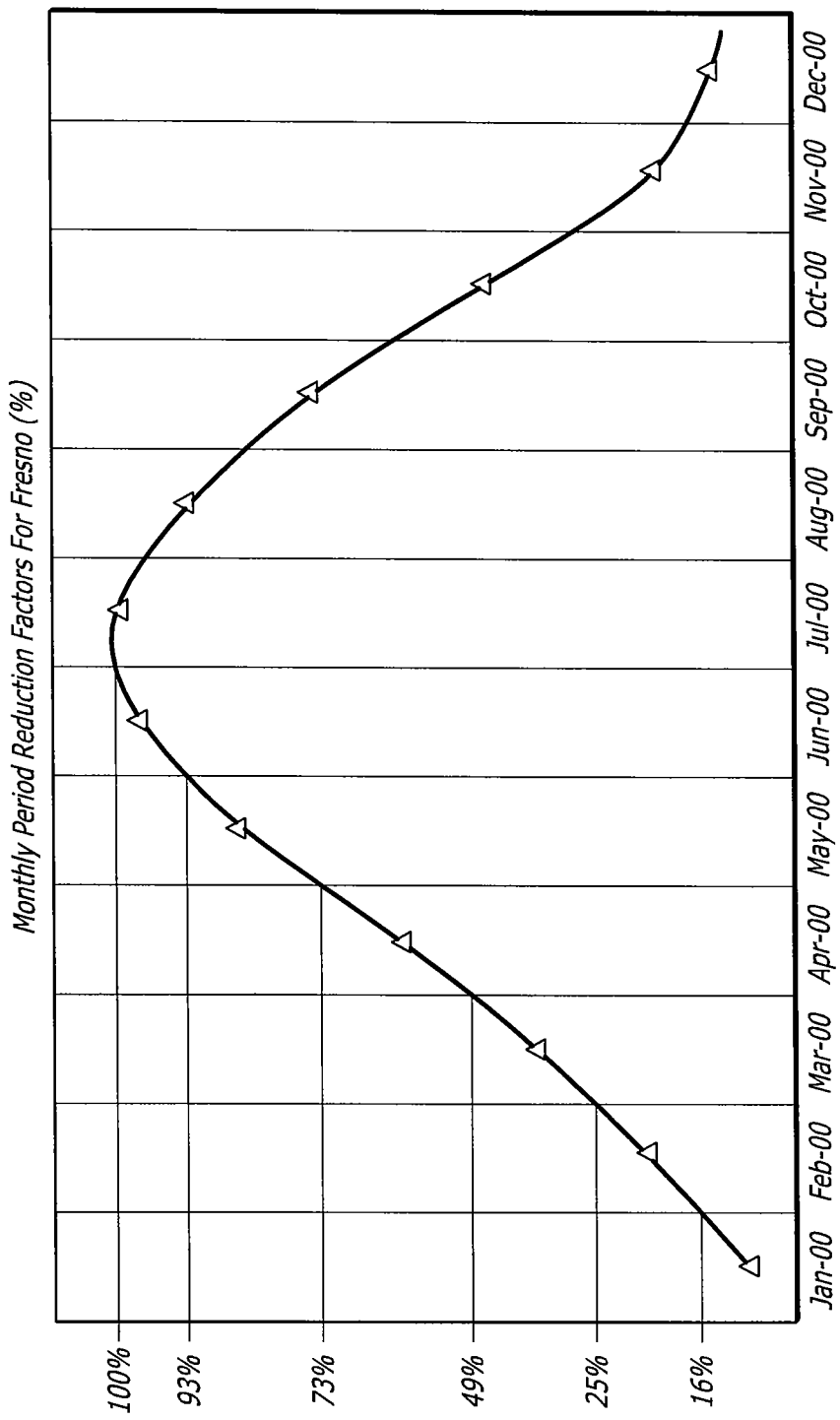
FIG. 4. is a graph of Monthly Period Reduction Factors for the sector Fresno, Calif.

Moreover, after the current "period" has passed (as noted, "period may be month, half month, week, day or other suitable time period), the microprocessor 30 is configured to sequentially recalculate the Actual Irrigation Duration in each new period by applying the Period Reduction Factor (PRF) associated with each new period, and causing the irrigation system to irrigate for the resulting Actual Irrigation Duration (Dactual) during the new current period. (See, FIG. 5.) For example, the curves of ET rate in FIGS. 3 and 4 show smoothed curves from which the Dactual may be derived on a daily basis.

It will be appreciated that, in use of the historic mode, after the above procedure of information entry and duration adjustment has been completed in a period that does not coincide with maximum ET rate, a user may monitor the actual irrigation duration, Dactual, caused by the controller according to the above described process. After observing the actual irrigation durations, it is possible that a user may conclude that insufficient water (or too much water) is being caused to discharge by the controller in each irrigation event. Under these circumstances, a user may manually alter the Dmax that he had previously input, so that the current Dactual increases or reduces proportionally. When the user is satisfied that the Dactual for the current period is acceptable, he can reasonably assume that the Dactual that will be caused in the period of greatest ET rate (that will in effect be 100% of Dmax) will be appropriate for that period also. Thus, by a series of small initial adjustments, even during a seasonal period when maximum ET rate does not exist, a user may achieve an optimal rate of irrigation that applies over the period of a whole year.

In the manner described, once the data entries have been made and adjustments are concluded, it will be appreciated that the microprocessor continually adjusts the irrigation duration for any individual sprinkler system to take into account the historic variation in period average ET rates over the period of a year, each adjustment being made incrementally after a period of time which may be a month, a half month, a week, or a day, depending on the requirements of the irrigation project. Preferably, use of the smooth ET rate and PRF curves exemplified in FIGS. 3 and 4 would permit adjustment to be made on a daily period basis.

This aspect of the invention thus has the advantage of efficiently and rationally applying a modification in water irrigated onto a landscape to accommodate the seasonal changes in historical ET rate of a particular sector, without reference to any temperature measurements in real time. The invention has versatility in that it may be sold, with a preprogrammed database 34 that includes either a table of Period Reduction Factors (PRFs), or the information necessary (e.g. ET rates) to extract, via an algorithm, PRFs in any sector based, preferably, on the postal zip code where the system 20 will be used. Thus, a purchaser may install such a system in Mississippi or in California and enter the information required to initialize the system, including the zip code where the system is to be used, and the date. In each case the information in the database allows the microprocessor 30, by using the database 34, to periodically select the duration of actual irrigation (Dactual) for any particular sector in a way that is rationally and efficiently based on the changing seasonal ET rate in the selected sector, and accounts for likely rainfall, and for dry, hot, and windy conditions. This aspect of the invention has the considerable advantage of relieving the user of responsibility for manually adjusting the duration for irrigation every period, which a user typically may forget to do after a few adjustments. It also has the advantage of achieving a result that is very similar to a result in which a sprinkler system uses a thermometer to measure the actual temperature as a basis for adjustment. This is particularly useful in situations where a thermometer that was once in communication with the controller has failed, leaving the controller without any real time information about the actual prevailing temperature conditions.

It will be appreciated that the Actual Irrigation Duration that is applied under the historical mode, differs from the Next Irrigation Duration that is applied based on prevailing temperature. In the case of the historical mode the Actual Irrigation Duration will be applied throughout a "period" which may be a month, a week, or a day, depending on the embodiment of the invention that is affected; whereas the Next Irrigation Duration depends on the maximum temperature of the previous day.

Weather Station Mode (Rain)

In another aspect of the invention, the processor may apply a Weather Station Mode (Rain) for adjusting an irrigation schedule according to prevailing rainfall. Preferably, this mode operates simultaneously with the Weather Station Mode (temperature). As previously noted, this mode may be terminated when the rain gauge signal alone fails if the signals are separately transmitted (first embodiment, FIG. 6), or when either one of the sensor signal fails if the two signals are transmitted as one pulse (second embodiment, FIG. 7). In order to operate in this mode, the controller may be configured to use the same historical data, stored in the database described above with reference to FIG. 3, to calculate an amount of time the entire irrigation system should be suspended from operation, after rain has been detected. In this regard, the controller is operatively connected to a rain measuring device that preferably follows a known tipping bucket design. An example of a suitable tipping bucket is disclosed in U.S. Pat. No. 3,943,762 which is incorporated herein by reference. The tipping bucket is configured to measure an accumulated amount of rain that has fallen in a region under control of the controller. Each time the bucket tips, this fact reflects that a certain amount of rain has accumulated since the last time it tipped, and a signal is sent to the controller informing that the bucket has tipped and therefore that a threshold amount of rain has fallen. Based on the received signal from the tipping bucket, the processor applies an algorithm (described in detail below) to determine for how long all irrigation operations should be suspended in order not to wastefully duplicate the rainfall with irrigated water.

In general, to achieve this result, the algorithm relies upon information in the same stored database which records the average historical evapotranspiration rate for each sector over each period in a year, as described above and exemplified in FIG. 3. The data is relied upon to calculate and determine a "rain evaporation time equivalent," which represents the amount of time that would be required to evaporate the rainfall measured by the tipping bucket, under the average seasonal historical evapotranspiration rate for the current date. The controller is configured to suspend the irrigation system for this amount of time.

The algorithm for irrigation suspension caused by rain operates under the following principles: As noted, the rain gauge in communication with the controller will preferably operate as a tipping bucket style rain gauge, for which each tip of the bucket represents a certain amount of rain that has recently fallen. In a preferred embodiment, each tip of a bucket represents 0.0325 inches of fallen rain. After the first tip of the bucket, the microprocessor identifies in the database a stored value which is the historical period-average evapotranspiration rate for the current period, referred to here for convenience as ETcurrent. (This is the same value used in the historic mode as the numerator of the Period Reduction Factor, and, as indicated in FIG. 3, its units are preferably inches of freestanding water evaporated per day.) To obtain the amount of time, as a fraction of a day, that it will theoretically take for the measured rainfall to evaporate under the historical period-average evapotranspiration rate for the current period, the processor divides the inches of rainfall by the ETcurrent. For example, 0.0325 inches of rainfall, divided by 0.095 inches evaporation per day for Fresno in April (see FIG. 3) equals about 0.34 days (or 8.1 hours). The controller is configured to then suspend the upcoming irrigation event for a period of 8.1 hours. This suspension prevents the controller from causing the same amount of water from being discharged onto a landscape through irrigation that has just fallen as rain, and it has a conserving effect on water supply while at the same time protecting the landscape from possible damage due to overwatering.

In yet a further preferred aspect of the invention, the controller may place limits on the duration of the calculated irrigation suspension. Under this aspect a limit, or a "cap," is placed on the duration of an irrigation suspension period in the amount of six hours for the first tip of a bucket (or, 0.0325 inches of rain). Upon the second tip, the controller imposes a maximum of 24 hours for the suspension period. Thereafter, a maximum of 96 hours suspension is placed on any future suspension computed to be applicable by the microprocessor. By thus "capping" the period of irrigation suspension, the invention takes account of the assumption upon which the calculations are based, that fallen rain is free standing on the ground. In reality, fallen rain may run off the ground to a drainage system or catchment area, or it may saturate the soil.

Thus, the amount of time that is theoretically calculated for rain to evaporate when it falls on dry soil may be longer than the time required in reality for the rainfall to evaporate. Therefore, the first two bucket tips are considered differently than the remaining tips, and the suspension periods calculated by the processor are capped as described for only the first two tips. However, once the first two tips have occurred and the appropriate suspension periods imposed, the assumption that the rainfall has become freestanding water is more realistic because the ground condition will have become more saturated, and no further caps are applied arising from bucket tips after the second tip. Finally, in a further aspect of the invention, an overall cap of 96 hours is preferably placed on any future calculated suspension period. Under this aspect, if a series of bucket tips are measured, the maximum amount of future time that irrigation will be suspended is 96 hours regardless of the calculated requirement. This is a safety feature which guards against possible malfunction of the rain gauge or any aspect of the invention. It is contemplated that 96 hours (four days) is a substantial period over which to suspend all irrigation. Accordingly, the microprocessor is preferably configured to not permit any single period of irrigation suspension to exceed 96 hours without the intervention of at least some rain (as measured by the rain gauge) during that time. Thus if, say, 36 hours of a 96 hour calculated suspension have run their course to leave a remaining 60 hour suspension requirement, and rain is again measured in the form of a bucket tip, the additional calculated suspension is added to the remaining 60 hour suspension subject to the 96 hour upper limit.

These features have the advantage of providing a structure adapted to conserve water and preserve crops and vegetation from destruction by over or under watering during overall irrigation. Thus, it will be apparent from the foregoing that, while particular forms of the invention have been illustrated and described, various modifications can be made without parting from the spirit and scope of the invention.

I claim:

1. A controller for controlling an irrigation schedule in an irrigation system, the irrigation system including a plurality of sprinkler heads connected via a plurality of conduits to a water source, the controller comprising:
    a rain gauge configured to transmit to the controller a signal representing a recent rainfall amount;
    a thermometer configured to transmit to the controller a signal representing a prevailing temperature value;
    an input means for permitting a user to enter irrigation parameters into the controller, wherein the parameters include:
    a Maximum Irrigation Duration;
    an identifier for identifying a sector in which the irrigation system is located;
    the current date;
    a database that includes stored information relating to historical meteorological conditions associated with each of a plurality of sectors located within a geographical area, the information including, for each sector:
    a historical period-average evapotranspiration rate for a plurality of periods over the duration of a year,
    a historical average solar radiation level for each month over the duration of a year;
    a solar radiation for the month of average summer high temperature;
    an average summer high temperature;
    wherein, a microprocessor is configured to calculate and apply an amount of time to suspend the next irrigation event due to rainfall, the amount of time being based on measured inches of rainfall divided by the historical period-average evapotranspiration rate for the current period;
    further wherein the microprocessor is configured to calculate and apply a Next Irrigation Duration being equal to the Maximum Irrigation Duration multiplied by a ratio based on the product of the historical average solar radiation level for the current month and the previous day's measured high temperature, divided by the product of the solar radiation for the month of average summer high temperature and the average summer high temperature; and
    wherein the microprocessor is configured to respond to a failure in receipt of a signal from at least one of the rain gauge or the thermometer by calculating and applying an Actual Irrigation Duration rather than a Next Irrigation Duration, the Actual Irrigation Duration being equal to the Maximum Irrigation Duration multiplied by a ratio, defined as a Period Reduction Factor, based on the historical period-average evapotranspiration rate for the current period divided by a maximum period-average evapotranspiration rate that occurs in the course of a year.

2. The controller of claim 1, wherein the sector identifier is a zip code.

3. The controller of claim 1, wherein the microprocessor is configured to sequentially recalculate the Actual Irrigation Duration in a new period by applying the historical period-average evapotranspiration rate associated with the new period, and causing the irrigation system to irrigate for the Actual Irrigation Duration during a new current period.

4. The controller of claim 1, wherein the Period Reduction Factor is based on a period that is a month.

5. The controller of claim 1, wherein the Period Reduction Factor is based on a period that is a week.

6. The controller of claim 1, wherein the Period Reduction Factor is based on a period that is a day.

7. A method of controlling an irrigation schedule by an irrigation system that includes a plurality of sprinkler heads connected via a plurality of conduits to a water source, the method comprising:
    compiling a database that includes information relating to historical evapo-transpiration rates for a plurality of sectors located within a geographical area;
    deriving, from the information, Period Reduction Factors applicable over a year for each sector, wherein the Period Reduction Factors are based on a historical period-average evapotranspiration rate for each period of the year for a sector, divided by a maximum period-average evapotranspiration rate that occurs in a year for that sector, whereby the database has an array of information in which each sector in a geographical area has, associated with it, a plurality of Period Reduction Factors, one Period Reduction Factor for each period of the year;
    entering irrigation parameters into a controller, wherein the parameters include:
    a Maximum Irrigation Duration;
    an identifier for identifying the sector in which the irrigation system is situated; and
    the current date;
    transmitting from a thermometer to the controller a signal reflecting a prevailing temperature value;
    checking whether the signal is received by the controller;
    if the signal is received by the controller, then:
    multiplying the Maximum Irrigation Duration by a temperature ratio, thereby computing a Next Irrigation Duration, wherein the temperature ratio is based on the product of a historical average solar radiation level for the current month and the previous day's high temperature, divided by the product of a solar radiation for the month of average summer high temperature and the average summer high temperature;

causing the irrigation system to irrigate for the Next Irrigation Duration at a next irrigation operation;

if the signal is not received by the controller, then:

adjusting the Maximum Irrigation Duration by multiplying the Maximum Irrigation Duration by a Period Reduction Factor for the current period associated with the sector that has been identified by a user, thereby obtaining an Actual Irrigation Duration for the current period for the identified sector; and causing the irrigation system to irrigate for the Actual Irrigation Duration during the current period.

8. The method of claim 7, further including:

transmitting from a rain gauge to the controller a signal reflecting an amount of rain that has fallen;

calculating, at historically prevailing rates of evapotranspiration, an amount of time required for the amount of rainfall to evaporate;

suspending irrigation operations for at least the amount of time.

9. The method of claim 7, wherein entering a sector identifier into the controller includes entering a zip code.

10. The method of claim 7 wherein the period associated with the Period Reduction Factor is one month.

11. The method of claim 7 wherein the period associated with the Period Reduction Factor is one week.

12. The method of claim 7, wherein the period associated with the Period Reduction Factor is one day.

13. The method of claim 10, wherein adjusting the Maximum Irrigation Duration includes sequentially recalculating the Actual Irrigation Duration in a new period by applying the historical period-average evapotranspiration rate associated the each new period, and causing the irrigation system to irrigate for the Actual Irrigation Duration during a new current period.

14. A method of controlling an irrigation schedule by an irrigation system that includes a plurality of sprinkler heads connected via a plurality of conduits to a water source, the method comprising:

compiling a database that includes information relating to historical evapo-transpiration rates for a plurality of sectors located within a geographical area;

deriving, from the information, Period Reduction Factors applicable over a year for each sector, wherein the Period Reduction Factors are based on a historical period-average evapotranspiration rate for each period of the year for a sector, divided by a maximum period-average evapotranspiration rate that occurs in a year for that sector, whereby the database has an array of information in which each sector in a geographical area has, associated with it, a plurality of Period Reduction Factors, one Period Reduction Factor for each period of the year;

entering irrigation parameters into a controller, wherein the parameters include:

a Maximum Irrigation Duration;

an identifier for identifying the sector in which the irrigation system is situated; and the current date;

transmitting from a rain gauge to the controller a signal reflecting an amount of rain that has fallen;

checking whether the signal is received by the controller;

if the signal is received by the controller, then:

calculating and applying an amount of time to suspend a next irrigation event due to rainfall, the amount of time being based on measured inches of rainfall divided by the historical period-average evapotranspiration rate for the current period;

causing the irrigation system to suspend the next irrigation event for the amount of time;

if the signal is not received by the controller, then:

adjusting the Maximum Irrigation Duration by multiplying the Maximum Irrigation Duration by a Period Reduction Factor for the current period associated with the sector that has been identified by a user, thereby obtaining an Actual Irrigation Duration for the current period for the identified sector; and causing the irrigation system to irrigate for the Actual Irrigation Duration during the current period.

15. The method of claim 14, wherein entering a sector identifier into the controller includes entering a zip code.

16. The method of claim 14 wherein the period associated with the Period Reduction Factor is one month.

17. The method of claim 14 wherein the period associated with the Period Reduction Factor is one week.

18. The method of claim 17, wherein the period associated with the Period Reduction Factor is one day.

19. The method of claim 14, wherein adjusting the Maximum Irrigation Duration includes sequentially recalculating the Actual Irrigation Duration in a new period by applying the historical period-average evapotranspiration rate associated with the new period, and causing the irrigation system to irrigate for the Actual Irrigation Duration during a new current period.

* * * * *